Feb. 24, 1948. C. W. DROUGHT 2,436,746
SELECTIVE GEAR REDUCTION UNITS
Filed July 12, 1943 2 Sheets-Sheet 1
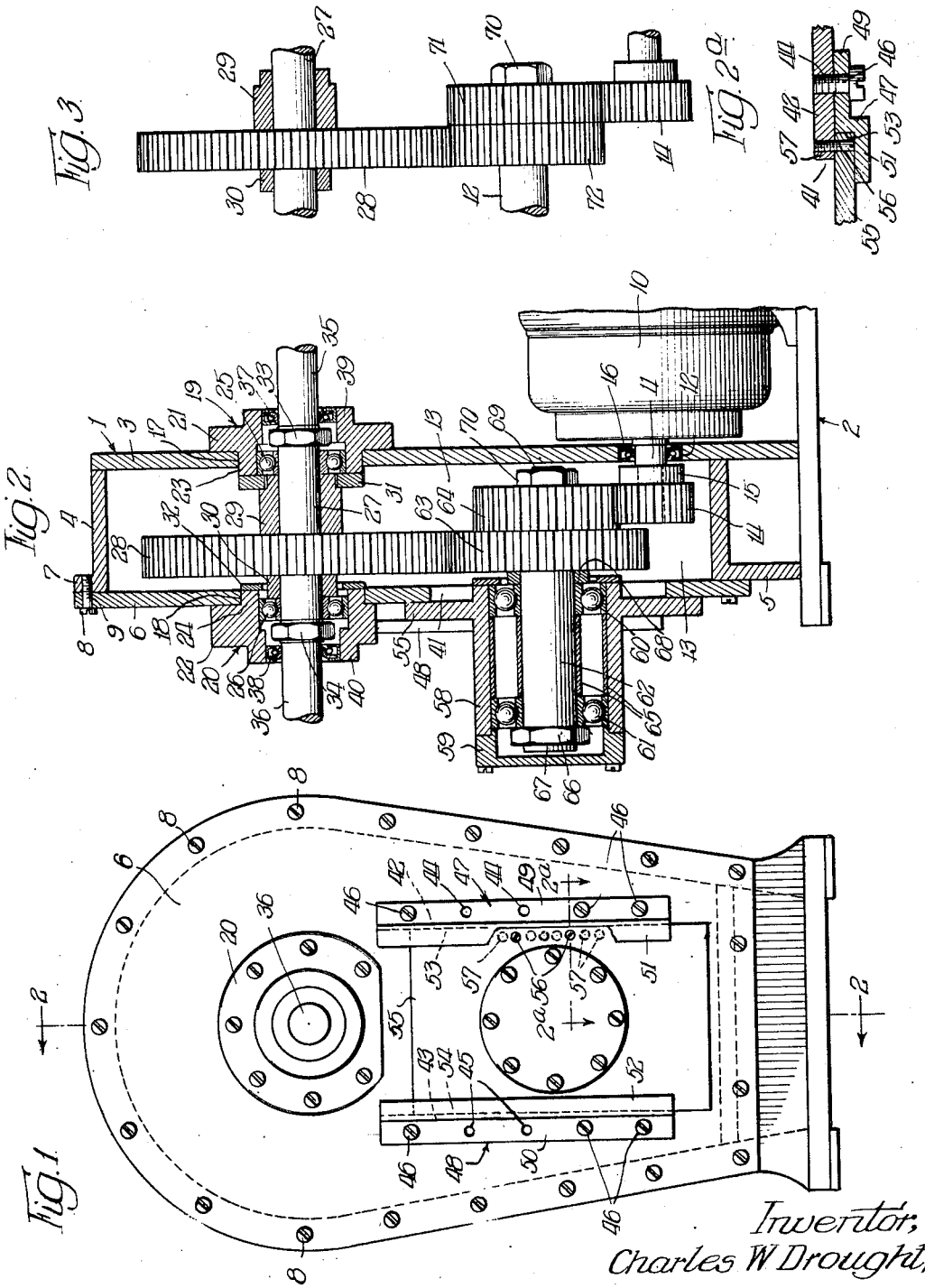
Inventor:
Charles W Drought,
By Stone, Artman & Bisson,
Attys Feb. 24, 1948.  C. W. DROUGHT  2,436,746
SELECTIVE GEAR REDUCTION UNITS
Filed July 12, 1943  2 Sheets-Sheet 2
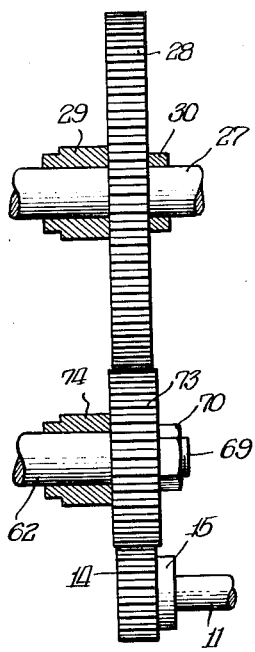
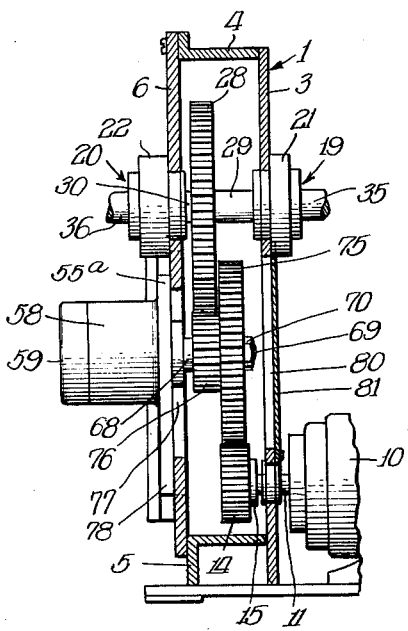
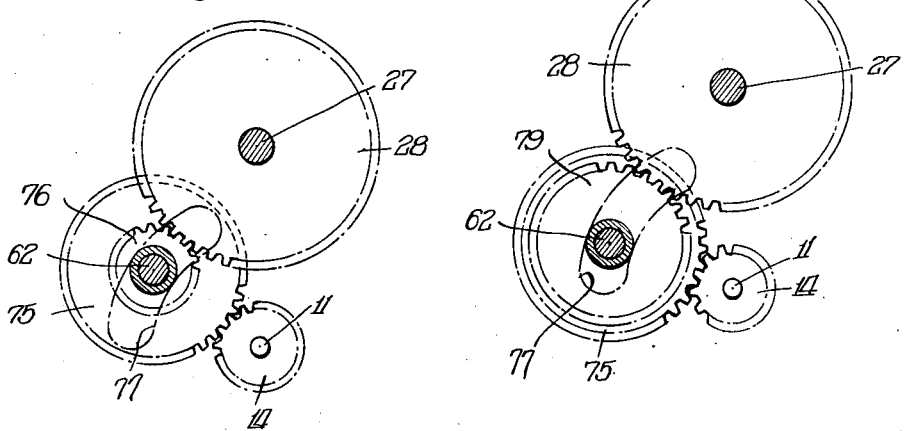
Inventor:
Charles W. Drought,
By Stone, Artman & Bisson,
Attys Patented Feb. 24, 1948

2,436,746

UNITED STATES PATENT OFFICE 2,436,746

SELECTIVE GEAR REDUCTION UNITS

Charles W. Drought, Berwyn, Ill.

Application July 12, 1943, Serial No. 494,293

6 Claims. (Cl. 74—325)

1

The present invention relates to gear drives, such as used on overhead trolley cranes, and particularly on the bridge thereof spanning the bay, for driving the wheels on the rails at the sides of the bay and at the ends of the bridge, and has reference more particularly to the gear reduction unit selectively bodily connected in the gear train between the driving motor and the wheel shaft.

When designing a drive for an overhead trolley crane it has been customary to build in the gear reduction drive between the motor and the shaft of the traction wheels on the tracks at the side of the bay. The particular speed of travel of the bridge for the motor used may not be what is desired for the loads the crane is intended to carry. To then redesign the gear ratio at the time of installation would involve loss of time and additional cost.

An object of the present invention is to provide a novel gear unit which is readily installed as a unit in operative connection with the driving gear or pinion on the motor shaft and the driven gear on the wheel shaft, and setting the unit in adjusted or selective position for the proper meshing of the gears of the unit with the gears of the motor and the wheel shaft, the housing for the gear drive in general having means for so adjustably or selectively setting or fixing the unit in place.

Another object of the invention is to provide a novel unitary structure which is carried by and fixed to the bridge of the crane and which includes a housing in which the gears are enclosed and closed from entry of dust and other foreign matter. The device also includes the idea of the motor being also located and fixed to the bridge adjacent to the housing for the gear train.

Accordingly, when a crane is designed and built it will have a gear unit in place. When the installation is made, and it is found that a different gear ratio is necessary for the particular work the crane is to perform, it is simply necessary to remove the gear unit first put in the device and to replace it by a gear unit having the desired gear ratio. In doing so the unit is adjustably secured in place to the housing and with a gear in mesh with the gear or pinion on the motor shaft and another gear in mesh with the driven gear on the wheel shaft. By way of example it may be assumed that when the crane is built the ratio of the driving motor gear to the driven gear of the unit is 1:2 and that the ratio of the driving gear of the unit to the driven gear on the wheel shaft is 2:3, then the overall

2 ratio of the drive is 1:3, but that might be a too fast driving of the wheel shaft, so the new unit set in place may be such that the ratios would be 1:3 and 1:2 with the overall ratio of 1:6 whereby the wheel shaft rotates one-half as fast as before. On the other hand, if it be desired to travel the bridge faster, then, a gear unit may be chosen and connected whereby the ratios would be 2:3 and 3:4 with the overall ratio of 1:2 whereby the wheel shaft rotates two-thirds as fast as the first example given above.

Another object of the invention is to provide a novel structure wherein the wheel shaft gear may be located in alternative positions to be driven by the gear unit depending upon the position of the larger gear in the unit, and also whereby the wheel shaft gear may be moved to a position to permit passage of the larger gear of the unit when such larger gear is in operative relation with the motor gear behind the smaller gear of the unit.

Other objects, advantages, capabilities, features and the like are comprehended by the invention as will later appear and as are inherently possessed by the invention.

Referring to the drawings:

Fig. 1 is a front view in elevation of an embodiment of the invention;

Fig. 2 is a longitudinal sectional view taken in a plane represented by line 2—2 in Fig. 1 of the drawings;

Fig. 2a is a fragmentary sectional view of a detail of the device;

Fig. 3 is a fragmentary sectional view similar to that shown on Fig. 2 but showing the relationship of a unit with a different ratio of gears;

Fig. 4 is a fragmentary sectional view of an alternative form of device;

Fig. 5 is a fragmentary vertical sectional view of a further alternative form of device; and Figs. 6 and 7 are fragmentary front elevational views of the device shown in Fig. 5 and showing the use of different ratioed gears in the unit.

Referring more in detail to the drawings the embodiments chosen to illustrate the invention are shown as comprising a housing 1 located upon and suitably fixed to a platform 2 of a bridge of the crane. The housing 1 has a rear wall 3, a surrounding wall 4 which is curved at the top and extends down at the sides to a base 5, and a front wall 6. The surrounding wall 4 has a frontal flange 7 provided with a series of holes for the receiving of bolts or screws or similar securing elements 8 for fastening the front wall 6 in place, the margin of the wall 6 also having corresponding holes, as holes 9, for the passage of the securing elements 8.

On the platform 2 is an electric motor 10 having a shaft 11 extending through an opening 12 provided in the rear wall 3 and into the chamber 13 of the housing 1. To the free end of the shaft 11 is fastened a driving gear or pinion 14 backed by a collar 15 on the shaft 11 and abutting a shouldered part of the shaft 11. In the opening 12 is located a suitable sealing means 16 about the shaft 11.

At the upper part of the housing 1 the rear and front walls 3 and 6 are provided with alined holes 17 and 18 respectively for receiving and holding bearing boxes 19 and 20. These bearing boxes have flanges 21 and 22 having a series of suitable holes in registry with like holes in the walls 3 and 6 for the reception of securing elements to fasten the boxes 19 and 20 firmly to the walls 3 and 6. The boxes 19 and 20 have hubs 23 and 24 extending through and fitting in the holes 17 and 18 and carrying bearing means 25 and 26, which may be of the ball bearing type, for rotatably supporting a shaft segment 27 connected, as keyed or splined, to a driven gear 28. Between the gear 28 and the bearing means 25 and 26, and on the shaft 27, are spacer sleeves 29 and 30 abutting the gear 28 at the inner ends of the sleeves and bearing means 25 and 26 at the outer ends of the sleeves. Suitable abutting rings 31 and 32 are provided at the inner ends of the hubs 23 and 24 and around the spacers 29 and 30. The spacers 29 and 30 may be interchanged in place so that the gear 28 may occupy a locus to the right of that shown in Fig. 2 when intended to be driven at different speeds as explained below.

The shaft portion 27 is a segment of a long shaft connected to the wheels of the bridge of the crane and is connected at its ends by suitable couplings 33 and 34 which are located within the bearing boxes 19 and 20 and which may act as thrust elements with reference to the bearing elements 25 and 26. The shaft portion 27 continues with shaft segments 35 and 36 which extend to the wheels running on the rails at the side of the bay. The couplings 33 and 34 afford a facile means for disconnecting the shaft segment 27 from the shaft segments 35 and 36 when it is desired to interchange the spacer sleeves 29 and 30, as shown for example in Fig. 4. The outer ends of the boxes 19 and 20 are sealed off from the outside by suitable seals 37 and 38 provided in the hub portions 39 and 40 of the boxes 19 and 20.

The front wall 6 towards its lower portion is provided with an opening 41 which is preferably of rectangular shape and has its vertical side edge portions or margins 42 and 43 provided with a series of holes 44 and 45 for the reception of securing elements such as screws or bolts or the like 46. See Fig. 2a. In overlapped relation with said side portions 42 and 43 are vertical side bars such as Z-bars 47 and 48, the base flanges 49 and 50 of which have openings for the passage of the securing elements 46 which rigidly hold the flanges with the vertical portions 42 and 43. The other or outer flanges 51 and 52 of the Z-bars are spaced from the edge portions or margins 42 and 43 to provide vertical channels 53 and 54 therebetween for affording vertical adjustment of the plate 55 as hereinafter described. This plate 55 is preferably rectangular in shape and sufficiently long to close the opening 41 in all vertical positions of the plate when adjusted as hereinafter explained. Each of the vertical side edge portions or margins of the plate 55 is provided with one or more vertically spaced holes for the reception of securing elements such as screws 56 (see Fig. 2a), and the marginal or edge portions 42 and 43 are provided with vertical series of threaded holes or sockets 57 for receiving the threaded ends of the screws 56 when the plate 51 has been adjusted in vertical position to desired height.

The plate 55 is a rigid part of a bearing box 58 having an end cap 59 and including bearing units 60 and 61 which may be of the ball bearing type as shown, for rotatably supporting a gear shaft 62 carrying gears 63 and 64 keyed or splined to that shaft. The bearing units 60 and 61 are held in spaced relation by a spacer 65 between them and on the shaft 62, a thrust element 66 as a nut screwed on the threaded end 67 of the shaft 62, and a thrust collar 68 on the shaft 62 and between the bearing means 60 and the gear 63. The inner end 69 of the shaft 62 is threaded and has a nut 70 for clamping the gears 63 and 64 together and for holding them in place. The gears 63 and 64 are in the chamber 13 with the gear 63 in mesh with the gear 28 and the gear 64 in mesh with the gear 14, as shown in Fig. 2. It will be noted that in Fig. 2 the gear 64 is of smaller diameter than the gear 63 but these gears may be of a different diameter ratio, such as shown in Fig. 3 wherein the gears 71 and 72 are of the same or substantially the same diameter whereby the drive effected is the same as if gear 14 were in mesh with the gear 28.

In both cases the gear unit is inserted or withdrawn through the opening 41. To do so the side clamping Z-bars 47 and 48 are removed. When removing a gear unit, the screws 56 are also removed and then the unit slid out axially of the shaft 62. When replacing a gear unit with a set of gears with a different ratio the nut 70 is removed and also the gears 64 and 63 and another set put in place such as gears 71 and 72, and the nut 70 screwed back in place. The unit is then slid in place to mesh gear 71 with gear 14 and gear 72 with gear 28. The axis of the shaft 62 and hence of the unit will be higher than that shown in Fig. 2 and the plate 55 is thus secured in place in a higher position over the opening 41 by screwing in the screws 56 in the higher holes or sockets 57 provided in the vertical side edge portions 42 of the wall 6. Then the side Z-bars are secured in place by way of the bolts or screws 46 and with the flanges 51 overlapping the side edge portions of the adjustable plate 55 and clamping it tight with the side portions 42 of the wall 6, besides also preventing the screws 56 working loose or working out.

Fig. 4 shows a drive wherein only one intervening gear 73 is used in the unit. In this case the spacers 29 and 30 on the wheel shaft are interchanged in position on the shaft segment 27 and the gear 28 positioned in the plane of the motor gear 14 with the gear 73 meshed with both the gears 14 and 28. To make up for the gear 63 not included a thrust bushing 74 is provided on the shaft 62 between the gear 73 and the bearing 60 in lieu of the bushing ring 68 shown in Fig. 2. In other respects the gear 73 forms part of a unit with the bearing housing 58 as in the cases shown in Figs. 2 and 3.

In the alternative structure shown in Figs. 5, 6 and 7 the gear unit instead of meshing axially with the gears 14 and 28 is made to swing in an arc about the axis of the motor shaft 11 or gear 14. This is convenient when using a gear which meshes with the motor gear 14 of greater diameter than the gear which meshes with the gear 28 on the wheel shaft. In this structure the housing parts, the bearing parts, and the motor are the same as shown in Fig. 2, and the same parts are designated or identified by the same reference characters.

The movable gear unit comprises gears 75 and 76 connected to the shaft 60 and held in place by the nut 70 screwed onto the threaded end 69 of the shaft 62, the gear 75 which meshes with gear 14 and constituting the rear gear being of greater diameter than the gear 76 constituting the front gear and which meshes with gear 28. A thrust ring 68 on the shaft 62 is interposed between the gear 76 and the bearing unit 60 (see Fig. 2 for this part) in the bearing housing 58. The front wall 6 of the housing 1 has an arc-shaped opening 77 (see Figs. 6 and 7) in which extends an inner hubbed end of a bearing box or housing 58 and along which the hubbed end may be moved to bring the gear 76 into mesh with the gear 28 or out of mesh therewith. The bearing box or housing 58 has a plate 55a which is preferably arc shaped and of such size designed and adapted to cover the arc slot 77 in any and all positions of the gear unit, in the same way as plate 55 in Figs. 1 and 2 covers the rectangular opening in the wall 6. Arc shaped Z-bars 78 may be attached to the wall 6 in the same way as the Z-bars 47 and 48 in Figs. 1 and 2 and have suitable holes for the securement of screws or bolts (not shown) for holding the unit in adjusted position, also similar to that in Figs. 1 and 2.

Figs. 6 and 7 differ only in that in Fig. 7 the gear 79, corresponding to the gear 76 in Fig. 6, is larger. Any other size of gear may be used as desired and necessary to obtain the final rotary speed of the wheel shaft 27. When it is desired to change gears of different sizes, such as gears 76 and 79, the nut 70 on shaft end 69 is loosened and removed. This is possible by use of a wrench, such as a socket wrench, through an opening 80 provided in the rear wall 3 of the main housing or casing 1. The gears 76 and 75 or 79 and 75 may be removed through the rear opening 80 and a new set inserted in place and the nut 70 secured on the threaded end of the shaft. The opening 80 is normally closed by a plate 81 held secured to the rear wall 3 of the housing 1 by any suitable securing means such as screws, bolts or the like.

While I have herein described and upon the drawings shown a few illustrative embodiments of the invention, it is to be understood that the invention is not limited thereto but comprehends other constructions, details, arrangements of parts, features, and the like, without departing from the spirit of the invention.

I claim:

1. A gear drive of the reduction type of the character described, comprising a base, a motor on the base and having a shaft, a driven shaft, a gear housing fixed to the base in line with the motor and having bearing means for rotatably supporting the driven shaft, said housing having spaced forward and rear walls provided with alined openings through which the driven shaft extends, a driven gear secured to the driven shaft within said housing, said housing being provided with an opening in the rear wall thereof opposite the motor for the extension therethrough of the motor shaft, a driving gear on the motor shaft within said housing, an intermediate gear unit operatively connected to said driven and said driving gears within said housing, the forward wall of said housing being provided with an opening alined with said gear unit, a cover member for said forward wall opening, an outboard bearing unit carried by said cover member, a shaft journalled in said outboard bearing as the sole support therefor and projecting into said housing for rotatively carrying said intermediate gear unit, and said cover member being adjustable to change the position of said outboard bearing unit and the shaft transversely of said opening for the accommodation of gear units of various speed ratios upon said shaft and in operative driving connection with said driving and driven gears.

2. A gear drive of the reduction type of the character described, comprising a base, a motor on the base and having a shaft, a driven shaft, a gear housing fixed to the base in line with the motor and having bearing means for rotatably supporting the driven shaft, said housing having opening means through which the driven shaft extends, a driven gear secured to the driven shaft within said housing, said housing being provided with an opening in the rear wall thereof opposite the motor for the extension therethrough of the motor shaft, a driving gear on the motor shaft within said housing, an intermediate gear unit operatively connected to said driven and said driving gears within said housing, the forward wall of said housing being provided with an opening alined with said gear unit, an outboard bearing unit disposed in registry with said front wall opening, an intermediate shaft journalled in said bearing unit as the sole support therefor and projecting into said housing as a journalled support for said intermediate gear unit, and adjustable mounting means for supporting said outboard bearing unit and hence said intermediate shaft in selected positions transversely of said opening for the alternative accommodation of gear unit arrangements of different speed ratio on said intermediate shaft.

3. A gear drive of the reduction type of the character described, comprising a base, a motor on the base and having a shaft, a driven shaft, a gear housing fixed to the base in line with the motor and having bearing means for rotatably supporting the driven shaft, said housing having spaced forward and rear walls of which at least one is provided with opening means through which the driven shaft extends, a driven gear secured to the driven shaft within said housing, said housing being provided with an opening in the rear wall thereof opposite the motor for the extension therethrough of the motor shaft, a driving gear on the motor shaft within said housing, an intermediate gear unit having gears of a given ratio within said housing and operatively connected to said driving and driven gears, the forward wall of said housing being provided with an opening alined with said gears of said intermediate gear unit and being of a diameter sufficient for the axial passing therethrough of the larger gear of said gears of said intermediate gear unit, said gear unit having a shaft extending through said latter opening, bearing means for said gear unit shaft, a bearing casing for said latter bearing means, a plate extending radially from said bearing casing and being of a larger size than the opening in said forward wall of the housing, and means for securing said plate to said forward wall and to close said latter opening.

4. A gear drive of the reduction type of the character described, comprising a base, a motor on the base and having a shaft, a driven shaft, a gear housing fixed to the base in line with the motor and having bearing means for rotatably supporting the driven shaft, said housing having spaced forward and rear walls provided with alined openings through which the driven shaft extends, a driven gear secured to the driven shaft within said housing, said housing being provided with an opening in the rear wall thereof opposite the motor for the extension therethrough of the motor shaft, a driving gear on the motor shaft within said housing, an intermediate gear unit having gears of a given ratio within said housing and operatively connected to said driving and driven gears, the forward wall of said housing being provided with an opening alined with said gears of said intermediate gear unit and being of a diameter sufficient for the axial passing therethrough of the larger gear of said gears of said intermediate gear unit, said gear unit having a shaft extending through said latter opening, bearing means for said gear unit shaft, a bearing casing for said latter bearing means, a plate extending radially from said bearing casing and being of a larger size than the opening in said forward wall of the housing, and means for securing said plate to said forward wall and to close said latter opening, said bearing means for said gear unit shaft having axially spaced bearing units, a spacer on said latter shaft and between said spaced bearing units to abut said spaced bearing units, an abutting member secured to the forward portion of said shaft in abutting relation to the forward side of the forward bearing unit of said bearing units, and another abutting member on said shaft between said other of said bearing units and the forward gear of said gears of said intermediate gear unit.

5. A gear drive of the reduction type of the character described, comprising a base, a motor on the base and having a shaft, a driven shaft, a gear housing fixed to the base in line with the motor and having bearing means for rotatably supporting the driven shaft, said housing having spaced forward and rear walls provided with alined openings through which the driven shaft extends, a driven gear secured to the driven shaft within said housing, said housing being provided with an opening in the rear wall thereof opposite the motor shaft for the extension therethrough of the motor shaft, a driving gear on the motor shaft within said housing, an intermediate gear unit operatively connected to said driven and said driving gears within said housing, the forward wall of said housing being provided with an opening alined with said gear unit, said gear unit having a shaft extending through said latter opening, bearing means for said gear unit shaft, said latter opening being of arc shape having its center of curvature in the axis of said driving gear, a bearing casing for said latter bearing means and having a rearwardly extending hub fitting slidably in said arc shaped opening, and means for securing said bearing casing to said forward wall of said housing and in position for the gear unit to mesh with said driven gear on said driven shaft.

6. A gear drive of the reduction type of the character described, comprising a base, a motor on the base and having a shaft, a driven shaft, a gear housing fixed to the base in line with the motor and having bearing means for rotatably supporting the driven shaft, said housing having spaced forward and rear walls provided with alined openings through which the driven shaft extends, a driven gear secured to the driven shaft within said housing, said housing being provided with an opening in the rear wall thereof opposite the motor for the extension therethrough of the motor shaft, a driving gear on the motor shaft within said housing, an intermediate gear unit operatively connected to said driven and said driving gears within said housing, the forward wall of said housing being provided with an opening alined with said gear unit, said gear unit having a shaft extending through said latter opening, bearing means for said gear unit shaft, said latter opening being of arc shape having its center of curvature in the axis of said driving gear, a bearing casing for said latter bearing means and having a rearwardly extending hub fitting slidably in said arc shaped opening, and means for securing said bearing casing to said forward wall of said housing and in position for the gear unit to mesh with said driven gear on said driven shaft, said securing means comprising a plate extending laterally from said bearing casing and being of a larger size than said arc shaped opening for closing said arc shaped opening in all positions of said gear unit and bearing housing about the axis of said driving gear, and said plate and forward wall also including securing elements for selectively securing said plate to said forward wall in any selected position of said gear unit and said bearing housing.

CHARLES W. DROUGHT.

REFERENCES CITED

The following references are of record in the file of this patent:

UNITED STATES PATENTS

| Number | Name | Date |
|---|---|---|
| 363,776 | Sweet | May 24, 1887 |
| 529,266 | Hill | Nov. 13, 1894 |
| 833,848 | Rundlett | Oct. 23, 1906 |
| 1,297,462 | Hallenbeck | Mar. 18, 1919 |
| 1,514,931 | Robertson | Nov. 11, 1924 |
| 1,576,702 | Ackerman | Mar. 16, 1926 |
| 2,130,979 | Wirth | Sept. 20, 1938 |
| 2,277,614 | Suhner | Mar. 24, 1942 |
| 2,363,556 | Saul | Nov. 28, 1944 |

FOREIGN PATENTS

| Number | Country | Date |
|---|---|---|
| 556,314 | Great Britain | Sept. 29, 1943 |
| 694,096 | France | Sept. 9, 1930 |
| 274,537 | Italy | May 23, 1930 |